(12) United States Patent
Wiederin et al.

(10) Patent No.: US 9,239,581 B1
(45) Date of Patent: Jan. 19, 2016

(54) VARIABLE ONLINE DILUTION

(71) Applicant: Elemental Scientific, Inc., Omaha, NE (US)

(72) Inventors: Daniel R. Wiederin, Omaha, NE (US); Austin Schultz, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 540 days.

(21) Appl. No.: 13/656,972

(22) Filed: Oct. 22, 2012

Related U.S. Application Data

(60) Provisional application No. 61/550,861, filed on Oct. 24, 2011, provisional application No. 61/602,675, filed on Feb. 24, 2012, provisional application No. 61/619,031, filed on Apr. 2, 2012.

(51) Int. Cl.
*G05D 11/02* (2006.01)
(52) U.S. Cl.
CPC ..................................... *G05D 11/02* (2013.01)

(58) Field of Classification Search
None
See application file for complete search history.

(56) References Cited

U.S. PATENT DOCUMENTS

| | | | | |
|---|---|---|---|---|
| 5,869,773 A | * | 2/1999 | Karlberg et al. | 73/863.01 |
| 5,907,108 A | * | 5/1999 | Garcia-Rubio et al. | 73/863.21 |
| 2009/0217742 A1 | * | 9/2009 | Chiu et al. | 73/61.55 |
| 2011/0290996 A1 | * | 12/2011 | Shaw et al. | 250/282 |

* cited by examiner

*Primary Examiner* — Robert R Raevis
(74) *Attorney, Agent, or Firm* — Advent, LLP

(57) ABSTRACT

A sample introduction system providing variable online dilution of a sample is described. In one or more implementations, the sample introduction system includes a sample pump configured to pump a sample in a specified time interval and a first carrier syringe pump configured to pump a volume of a carrier to be combined with the sample in the specified time interval. A control module is configured to receive a specified dilution level for the sample (e.g., input by an operator) and selectively adjust the volume of the carrier pumped by the first carrier syringe pump in the specified time interval to furnish the specified dilution for the sample.

14 Claims, 3 Drawing Sheets

VARIABLE ONLINE DILUTION

CROSS-REFERENCE TO RELATED APPLICATIONS

The present application claims the benefit under 35 U.S.C. §119(e) of U.S. Provisional Application Ser. No. 61/550,861, filed Oct. 24, 2011, and titled "VARIABLE ONLINE DILUTION;" U.S. Provisional Application Ser. No. 61/602,675, filed Feb. 24, 2012, and titled "VARIABLE ONLINE DILUTION;" and U.S. Provisional Application Ser. No. 61/619,031, filed Apr. 2, 2012, and titled "INTERMITTENT/DISCONTINUOUS SAMPLE INTRODUCTION TO AN ICP TORCH." U. S. Provisional Application Ser. Nos. 61/550,861, 61/602,675, and 61/619,031 are herein incorporated by reference in their entireties.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

A sample introduction system providing variable online dilution of a sample is described. In one or more implementations, the sample introduction system includes a sample pump configured to pump a sample in a specified time interval and a first carrier syringe pump configured to pump a volume of a carrier to be combined with the sample in the specified time interval. A control module is configured to receive a specified dilution level for the sample (e.g., input by an operator) and selectively adjust the volume of the carrier pumped by the first carrier syringe pump in the specified time interval to furnish the specified dilution for the sample.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
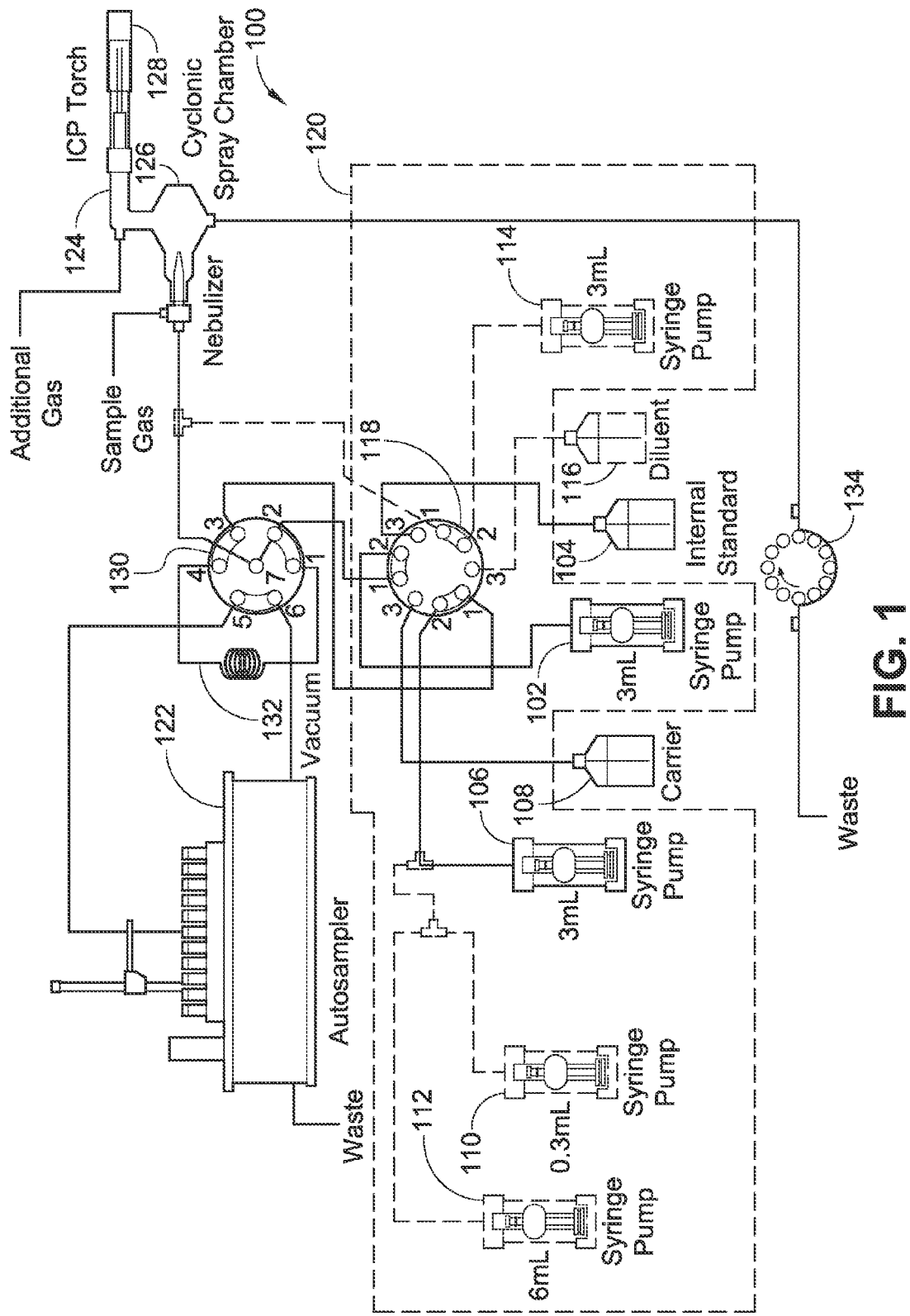
FIG. 1 is a diagrammatic view of apparatus for performing variable online dilution in accordance with example implementations of the present disclosure.

Peristaltic pumps and/or rotary piston pumps can be used to dilute an internal standard/spike and/or a sample for analysis with spectrometry equipment. However, it may be difficult for a peristaltic pump to function when backpressure is generated at the peristaltic pump. Further, as successive dilutions of an internal standard are supplied (e.g., to create a calibration curve in the case of an internal sample), it becomes necessary to change tubing between each dilution, adding to the time, complexity, and expense associated with calibrating equipment. For example, a test sample can be divided into several test portions. Known quantities of an internal standard are then added to "spike" one or more of the test portions prior to analysis. Another of the test portions is analyzed without the internal standard ("unspiked"). This technique can be used to determine the content of an analyte in a test sample, while accounting for the analytical procedure, compensating for matrix effects, and so forth. In this type of test configuration, it is generally desirable that the amount of standard analyte added to a test sample is similar to the amount of analyte already present in the test sample (e.g., in some instances, the amount of standard analyte added to a test sample ranges from about one to five time (1-5×) the amount of analyte present in the sample). However, if the concentration of analyte in the test sample is not known prior to analysis, it may be necessary to spike a number of test portions with increasing quantities of analyte to create a calibration curve, necessitating a change in tubing between each successive dilution.

Typically with spectrometry equipment, fluid is continuously introduced to a nebulizer, which is used to aerosolize the fluid (e.g., using a nebulizer gas). For example, a sample fluid and a carrier fluid may be continuously pumped to a nebulizer, a sample fluid may be intermittently pumped to a nebulizer while a carrier fluid is continuously pumped to a nebulizer, a rinse solution may be pumped to a nebulizer when the sample fluid and the carrier fluid are not being pumped to the nebulizer, and so forth. Continuously pumping fluid to a nebulizer in this manner can lead to increased liquid waste, greater rinse solution consumption, and/or an increased likelihood of flooding a spray chamber connected to a nebulizer (e.g., when an instrument is not being used to analyze samples). Further, this configuration can make it difficult to change-over between solvent systems due to the effects of residual fluid in the nebulizer and/or spray chamber from continuous pumping. Additionally, in some instances sequential samples introduced one immediately after another may chemically react in the aerosol phase (e.g., via acid/base interaction, organic solvent/water interaction, polymerizing chemical interaction, and so forth). This interaction can lead to noise, precipitation, and/or unwanted chemical reactions.

Accordingly, systems are described that are configured to introduce liquid to a nebulizer only when a sample is introduced. The systems include a sample pump, where the sample pump is configured to supply aliquots of a sample to a nebulizer during two separate time intervals, where the two time intervals are separated by another time interval during which at least substantially no liquid is provided to the nebulizer. Thus, the sample pump is stopped between each sample aliquot, i.e., such that air (e.g., air bubbles) and other gasses or liquids fluids are not introduced through a sample capillary when the sample is not being introduced. However, nebulizer gas may be continuously supplied to the nebulizer, including during time intervals when sample fluid is not being supplied to the nebulizer. This may allow a spray chamber connected to a nebulizer to dry between successive samples when, for instance, a long enough waiting time is provided between samples. In implementations, a sample pump can also be used to provide a pre-rinse and/or post-rinse of the spray chamber between successive samples. Systems configured in accordance with the present disclosure can provide higher quality data than typical sample introduction systems for liquid samples. For example, such systems can allow for better and/or more stable calibrations at very low sample concentrations, such as for single digit parts per trillion (ppt) concentrations.

Systems configured in accordance with the present disclosure may also include one or more dilution pumps to provide variable online dilution. The systems can be configured to supply an internal standard or a sample using a sample pump, while dilution pumps are controlled to selectively adjust amounts of a carrier and/or a diluent supplied with the internal standard or the sample. Thus, a calibration curve can be created using a single internal standard by varying the ratio of diluent to internal standard using the dilution pumps. Further, the internal standard can be pumped at a constant flow rate for each successive dilution. In implementations, the one or more dilution pumps can also be stopped during time intervals when the sample pump is not pumping sample to a nebulizer.

In implementations where the internal standard or the sample and the carrier are supplied to Inductively Coupled Plasma (ICP) or ICP Mass Spectrometry (ICP-MS) equipment, high dilution flows and carrier flows can be mixed to achieve a steady signal output from the equipment. In example implementations, an internal standard and a sample can be mixed before the addition of a diluent. Mixing the internal standard and the sample can mitigate or prevent a Venturi effect that may otherwise be present when a high diluent flow suctions some of a sample (e.g., at a valve or tee), creating a fluctuating sample flow that causes a temporary high signal, followed by a low signal as the sample flow is recharged at a low flow rate. In one example, when a sample flow rate of two and one half microliters per minute (2.5 µL/min) is used to mix a sample with a diluent at a diluent flow rate of four hundred ninety seven and one half microliters per minute (497.5 µL/min), a first dilution factor (DF1) for the mixture will be two hundred (200) (e.g., (497.5+2.5)/2.5). When the resulting mixture is mixed at a flow rate of five hundred microliters per minute (500 µL/min) with an internal standard at an internal standard flow rate of one hundred fifty microliters per minute (150 µL/min) a second dilution factor (DF2) for the mixture will be one and three tenths (1.3) (e.g., (150+500)/500). However, when the sample is first mixed with the internal standard, the first dilution factor (DF1) will be sixty one (61) (e.g., (150+2.5)/2.5), while the second dilution factor (DF2) will be about four and twenty six one hundredths (4.26) (e.g., (497.5+152.5)/152.5). Further, the internal standard or the sample may be supplied using a separate pump from the carrier or the diluent so that it is not necessary to clean the pumps connected to the internal standard, the sample, the carrier, and/or the diluent between each dilution.

The techniques described herein may be implemented in a system that includes a sample pump and one or more dilution pumps to provide variable online dilution. In one or more implementations, the techniques may be implemented as one or more software modules stored in the memory of a device included with the system and executed by the processing system of the device. As described herein, the processing system may execute the module(s) to selectively adjust amounts of a carrier and/or a diluent supplied with an internal standard or a sample. The techniques described herein thus furnish the user of the system with variable online dilution. For example, the system may provide autodilution of a sample and/or an internal standard, linear auto calibration, accurate sample dilution, and so forth. Thus, variable amounts of an internal standard can be mixed with a sample using, for example, a single prepared spike solution. The spike can be diluted automatically using a diluent solution in-line or on-line (e.g., as required by a specified dilution factor). This can result in a savings in labor, provide reliable and precise dilution, allow for a micro standard additions system (e.g., where a required amount of sample is only microliters), provide on-line additions and variable dilution at the same time, and so forth. Allowing for variable dilution and standard addition at the same time may be particularly useful with a viscous solution (e.g., in the case of sulfuric acid, $H_2SO_4$).

In the following discussion, an example system environment is first described. Exemplary procedures are then described that may be employed with the example environment, as well as with other environments and devices without departing from the spirit and scope thereof.

Example Implementations

Figure 2:
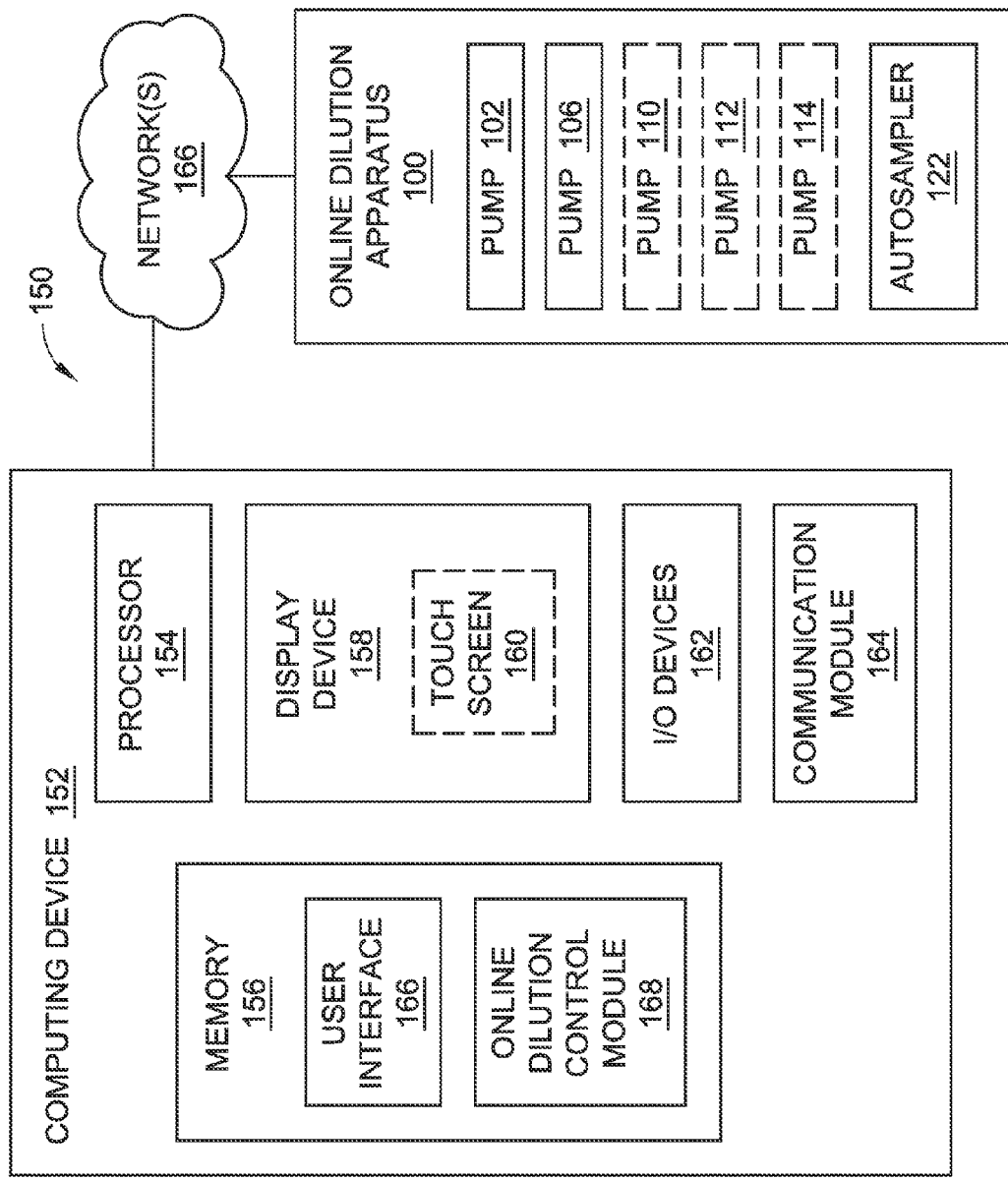
FIG. 2 is a block diagram illustrating an example variable online dilution environment in accordance with example implementations of the present disclosure.

FIGS. 1 and 2 illustrate an example variable online dilution environment 150 that is operable to perform the techniques discussed herein. The variable online dilution environment 150 includes a computing device 152 operable to provide variable online dilution functionality to online dilution apparatus 100. The online dilution apparatus 100 may be configured in a variety of ways. For instance, the online dilution apparatus 100 may comprise two pumps, including a sample pump (e.g., a three milliliter (3 mL) internal standard syringe pump 102) for supplying a sample (e.g., an internal standard/spike 104), and a dilution pump (e.g., a three milliliter (3 mL) first carrier syringe pump 106) for supplying a diluent, such as a carrier 108.

Additionally, the online dilution apparatus 100 may comprise more than two pumps, such as three pumps, four pumps, and so forth. For example, the online dilution apparatus 100 may comprise the internal standard syringe pump 102, the first carrier syringe pump 106, and other carrier pumps, such as a three tenths milliliter (0.3 mL) second carrier syringe pump 110, and/or a six milliliter (6 mL) third carrier syringe pump 112 for supplying the carrier 108. The online dilution apparatus 100 may also include a diluent pump (e.g., a three milliliter (3 mL) diluent syringe pump 114) for supplying a diluent 116.

In implementations, the online dilution apparatus 100 can be configured to supply liquid (e.g., sample, carrier, diluent, rinse solution and so forth) to a nebulizer 124 coupled with a cyclonic spray chamber 126 only when sample is supplied to the nebulizer 124. For example, the internal standard syringe pump 102 and/or the first carrier syringe pump 106 may supply a first aliquot of sample and/or carrier to the nebulizer 124 during a first time interval, stop supplying the first aliquot of sample and/or carrier at the end of the first time interval, supply at least substantially no liquid (e.g., no sample and/or carrier) to the nebulizer 124 during a second time interval subsequent to the first time interval, and supply a second aliquot of sample and/or carrier to the nebulizer 124 during a third time interval subsequent to the second time interval. In this manner, the online dilution apparatus can be configured to stop the pumping system between each sample to prevent liquid or sample gas from entering the nebulizer 124 for a period of time between samples, and possibly for an extended period of time after ICP or ICP-MS analysis, for example, is completed. Further, the second time interval can be selected such that the cyclonic spray chamber 126 is cleared of nebulized aerosol between samples, which can prevent unwanted chemical reactions in the aerosol phase, which may otherwise cause deleterious effects. For example, nebulizer gas can be supplied at least substantially continuously to the nebulizer 126 during the first time interval, the second time interval, and the third time interval.

While the present disclosure describes providing liquid to a nebulizer only when sample is provided to the nebulizer, it should be noted that "sample" within the context of the present disclosure may refer to sample fluid for analysis (e.g., by spectrometry equipment), carrier and/or diluent to be combined with sample, and/or rinse solution. Thus, a carrier may be used with a liquid sample during a first time interval, and the supply of carrier and sample may be stopped subsequent to the first time interval, such that substantially no liquid is supplied to the nebulizer during a second time interval subsequent to the first time interval. Then, a rinse solution may be supplied to the nebulizer during a third time interval subsequent to the second time interval.

Referring now to FIG. 1, the internal standard syringe pump 102, the first carrier syringe pump 106, the second carrier syringe pump 110, the diluent syringe pump 114, and/or other pumps (e.g., the third carrier syringe pump 112) may be coupled with a first rotary valve 118 and included in a single hardware module 120 (e.g., provided with a unitary housing). For example, output lines of the internal standard syringe pump 102 and the diluent syringe pump 114 may be directly connected to the first rotary valve 118, while output lines of the first carrier syringe pump 106, the second carrier syringe pump 110, and possibly the diluent syringe pump 114 may be connected together, and the resulting output may be connected to the first rotary valve 118. However, hardware module 120 is provided by way of example only and is not meant to be restrictive of the present disclosure. Thus, it will be appreciated that other hardware modules having different configurations may be provided in accordance with the present disclosure.

The internal standard syringe pump 102 is configured to pump the internal standard 104 in a specified time interval, and the first carrier syringe pump 106 and/or the diluent syringe pump 114 are configured to pump volumes of the carrier 108 and/or the diluent 116 in the specified time interval. In some implementations, the second carrier syringe pump 110 can be configured to pump another volume of the carrier 108 in the specified time interval. Similarly, the third syringe pump 112 can be configured to pump a further volume of the carrier 108 in the specified time interval. In this manner, various dilutions of the internal standard 104 and/or a sample can be furnished online by controlling amounts of the carrier 108 and/or the diluent 116 that are supplied by the first carrier syringe pump 106, the second carrier syringe pump 110, the third carrier syringe pump 112, the diluent syringe pump 114, and/or further syringe pumps, while pumping the internal standard 104 and/or a sample during a specified time interval.

The syringes of the different syringe pumps can be moved at different rates to create the desired dilutions. For example, the syringe of the first carrier syringe pump 106 and/or the syringe of the second carrier syringe pump 110 can be moved to generate flow rates ranging from between about one half milliliter per minute to one hundred milliliters per minute (½ mL/min-100 mL/min). However, this range is provided by way of example only and is not meant to be restrictive of the present disclosure. Thus, flow rates of less than one half milliliter per minute (½ mL/min) and/or more than one hundred milliliters per minute (100 mL/min) can also be used in accordance with the present disclosure. Further, the syringes can be actuated alone, one at a time (i.e., in a sequence of two or more), and/or at the same time (i.e., in groups of two or more). Additionally, the syringes may be actuated at the same rate or at different rates to achieve various dilutions of the internal standard. In implementations, dilutions can be created that range from, but are not necessarily limited to: one to fifty (1:50), one to one hundred (1:100), and one to two hundred (1:200).

In an implementation, a sample flow rate of two hundred and fifty microliters per minute (250 µL/min) is used to mix a sample with a diluent or a mixture of a spike and a spike diluent supplied at a flow rate of one hundred fifty microliters per minute (150 µL/min). The spike can be supplied using, for example, a three hundred microliter (300 µL) syringe, while the spike diluent can be supplied using, for example, a three thousand microliter (3,000 µL) syringe. In a first instance, spike diluent is supplied at a flow rate of one hundred fifty microliters per minute (150 µL/min). In a second instance, the spike diluent is supplied at a flow rate of one hundred and forty microliters per minute (140 µL/min) and the spike is supplied at a flow rate of ten microliters per minute (10 µL/min). In a third instance, the spike diluent is supplied at a flow rate of one hundred thirty microliters per minute (130 µL/min) and the spike is supplied at a flow rate of twenty microliters per minute (20 µL/min). In a fourth instance, the spike diluent is supplied at a flow rate of one hundred microliters per minute (100 µL/min) and the spike is supplied at a flow rate of fifty microliters per minute (50 µL/min). The total flow rate in each instance is four hundred microliters per minute (400 µL/min) and the dilution factors are about one (1), one and seventy one thousandths (1.071), one and one hundred fifty four thousandths (1.154), and one and a half (1.5), respectively.

In another implementation, a sample flow rate of fifteen microliters per minute (15 µL/min) is used to mix a sample with a diluent or a mixture of a spike and a spike diluent supplied at a flow rate of two hundred and eighty five microliters per minute (285 µL/min). In a first instance, spike diluent is supplied at a flow rate of two hundred and eighty five microliters per minute (285 µL/min). In a second instance, the spike diluent is supplied at a flow rate of two hundred and eighty two microliters per minute (282 µL/min) and the spike is supplied at a flow rate of three microliters per minute (3 µL/min). In a third instance, the spike diluent is supplied at a flow rate of two hundred and seventy nine microliters per minute (279 µL/min) and the spike is supplied at a flow rate of six microliters per minute (6 µL/min). In a fourth instance, the spike diluent is supplied at a flow rate of two hundred and seventy microliters per minute (270 µL/min) and the spike is supplied at a flow rate of fifteen microliters per minute (15 µL/min). In a fifth instance, the spike diluent is supplied at a flow rate of two hundred fifty five microliters per minute (255 µL/min) and the spike is supplied at a flow rate of thirty microliters per minute (30 µL/min). The total flow rate in each instance is three hundred microliters per minute (300 µL/min)

and the dilution factors are about one (1), one and eleven thousandths (1.011), one and twenty two thousandths (1.022), one and fifty six thousandths (1.056), and one and one hundred eighteen thousandths (1.118), respectively.

In some instances, the flow rates of the sample and/or the internal standard can be varied during an analysis period to achieve faster analysis using spectroscopy equipment. For example, a sample can be mixed with a diluent at a dilution factor of 200 (and optionally with an internal standard), e.g., using a valve having an internal volume of five microliters (5 µL), a sample flow rate of two and a half microliters per minute (2.5 µL/min), and a diluent flow rate of four hundred ninety seven and a half microliters per minute (497.5 µL/min). In this configuration, spectroscopy instrumentation can take up to about two minutes (2 min) to stabilize. However, by increasing the flow rate of the mixture from five hundred microliters per minute (500 µL/min) to two thousand microliters per minute (2,000 µL/min), the signal can take about thirty seconds to stabilize. In implementations, this can be accomplished by varying the flow rates of both the sample and the diluent, rather than the flow rate of the sample alone (which may result in, for example, high salt reaching the instrument, an unstable mixture, and so forth).

The online dilution apparatus 100 may include a sampler assembly, such as an autosampler 122, for automatically collecting a sample from a number of samples contained in test tubes, and so forth. The online dilution apparatus 100 may also include a nebulizer 124 coupled with a cyclonic spray chamber 126 for supplying an Inductively Coupled Plasma (ICP) torch 128 with sample gas, samples from the autosampler 122, the internal standard 104, the carrier 108, and/or the diluent 116. A second rotary valve 130 may be coupled with the autosampler 122, the nebulizer 124, and the first rotary valve 118 of the hardware module 120. The second rotary valve 130 may receive samples from the autosampler 122, the internal standard 104, the carrier 108, and/or the diluent 116 and supply them to the nebulizer 124. The second rotary valve 130 may also be coupled with a sample loop 132 for holding priming fluid and so forth. A peristaltic pump 134 may be used to evacuate waste from the nebulizer 124. For example, the peristaltic pump 134 may be connected to a drain chamber of the nebulizer 124.

In FIG. 2, the computing device 152 is illustrated as including a processor 154 and a memory 156. The processor 154 provides processing functionality for the computing device 152 and may include any number of processors, micro-controllers, or other processing systems, and resident or external memory for storing data and other information accessed or generated by the computing device 152. The processor 154 may execute one or more software programs that implement the techniques and modules described herein. The processor 154 is not limited by the materials from which it is formed or the processing mechanisms employed therein and, as such, may be implemented via semiconductor(s) and/or transistors (e.g., electronic integrated circuits (ICs)), and so forth.

The memory 156 is an example of device-readable storage media that provides storage functionality to store various data associated with the operation of the computing device 152, such as the software program and code segments mentioned above, or other data to instruct the processor 154 and other elements of the computing device 152 to perform the techniques described herein. Although a single memory 156 is shown, a wide variety of types and combinations of memory may be employed. The memory 156 may be integral with the processor 154, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device 152, the memory 156 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device 152 includes a display 158 to display information to a user of the computing device 152. In embodiments, the display 158 may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 158 may be backlit via a backlight such that it may be viewed in the dark or other low-light environments.

The display 158 may be provided with a touch screen 160 to receive input (e.g., data, commands, etc.) from a user. For example, a user may operate the computing device 152 by touching the touch screen 160 and/or by performing gestures on the touch screen 160. In some embodiments, the touch screen 160 may be a capacitive touch screen, a resistive touch screen, an infrared touch screen, combinations thereof, and the like. The computing device 152 may further include one or more input/output (I/O) devices 164 (e.g., a keypad, buttons, a wireless input device, a thumbwheel input device, a trackstick input device, and so on). The I/O devices 164 may include one or more audio I/O devices, such as a microphone, speakers, and so on.

The computing device 152 may also include a communication module 164 representative of communication functionality to permit computing device 152 to send/receive data between different devices (e.g., components/peripherals) and/or over one or more networks 166. Communication module 164 may be representative of a variety of communication components and functionality including, but not necessarily limited to: a browser; a transmitter and/or receiver; data ports; software interfaces and drivers; networking interfaces; data processing components; and so forth.

The one or more networks 166 are representative of a variety of different communication pathways and network connections which may be employed, individually or in combinations, to communicate among the components of the variable online dilution environment 150. Thus, the one or more networks 166 may be representative of communication pathways achieved using a single network or multiple networks. Further, the one or more networks 166 are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device 152 is illustrated as including a user interface 166, which is storable in memory 156 and executable by the processor 154. The user interface 166 is representative of functionality to control the display of information and data to the user of the computing device 152 via the display 158. In some implementations, the display 158 may not be integrated into the computing device 152 and may instead be connected externally using universal serial bus (USB), Ethernet, serial connections, and so forth. The user interface 166 may provide functionality to allow the user to interact with one or more applications of the computing device 152 by providing inputs via the touch screen 160 and/or the I/O devices 162. For example, the user interface 166 may cause an application programming interface (API) to be generated to expose functionality to an online dilution control module 168 to configure the application for display by the display 158 or in combination with another display. In embodiments, the API may further expose functionality to configure the online dilution control module 168 to allow the user to interact with an application by providing inputs via the touch screen 160 and/or the I/O devices 162.

Online dilution control module 168 may comprise software, which is storable in memory 156 and executable by the processor 154, to perform a specific operation or group of operations to furnish functionality to the computing device 152. The online dilution control module 168 provides functionality to control the dilution of the internal standard 104 and/or the samples from the autosampler 122. For example, the online dilution control module 168 may control amounts of the carrier 108 and/or the diluent 116 that are supplied by the first carrier syringe pump 106, the second carrier syringe pump 110, the third carrier syringe pump 112, the diluent syringe pump 114, and/or further syringe pumps, while pumping the internal standard 104 and/or a sample during a specified time interval.

In implementations, the user interface 166 may include a browser (e.g., for implementing functionality of the online dilution control module 168). The browser enables the computing device 152 to display and interact with content such as a webpage within the World Wide Web, a webpage provided by a web server in a private network, and so forth. The browser may be configured in a variety of ways. For example, the browser may be configured as an online dilution control module 168 accessed by the user interface 166. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the variable online dilution environment 150 of FIGS. 1 and 2, for example, can be wired, wireless, or some combination thereof. In the case of a software implementation, for instance, a module may represent executable instructions that perform specified tasks when executed on a processor, such as the processor 154. The program code can be stored in one or more device-readable storage media, an example of which is the memory 156 associated with the computing device 152 of FIG. 2.

Example Procedures

The following discussion describes procedures that may be implemented in online dilution apparatus providing variable online dilution functionality. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the variable online dilution environment 150 of FIGS. 1 and 2. The features of techniques described below are platform-independent, meaning that the techniques may be implemented on a variety of commercial platforms having a variety of processors.

Figure 3:
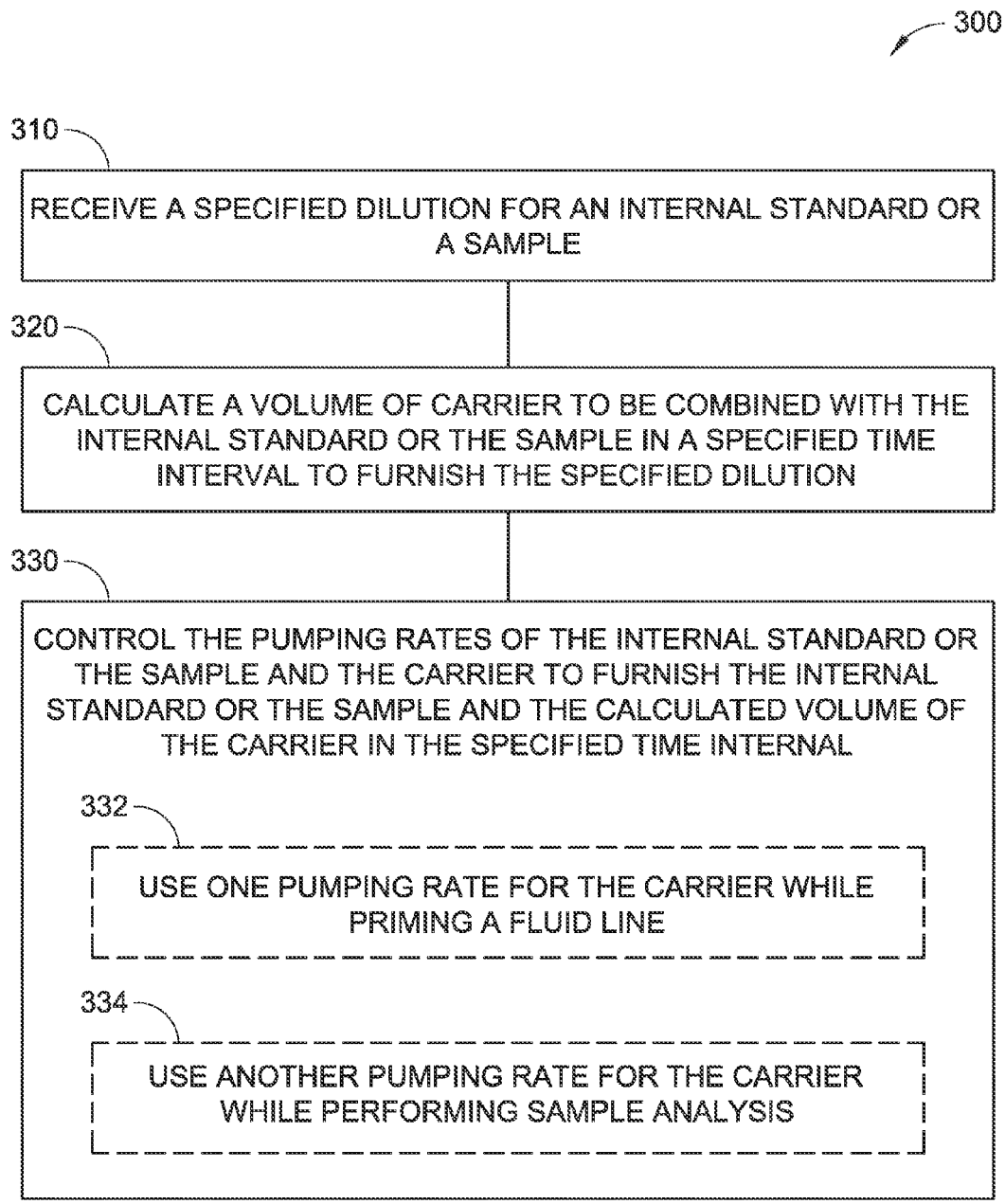
FIG. 3 is a flow diagram illustrating a method for performing variable online dilution in accordance with example implementations of the present disclosure.

FIG. 3 depicts a procedure 300 in an example implementation in which variable online dilution is provided with online dilution apparatus. As shown in FIG. 3, a specified dilution is received for an internal standard or a sample (Block 310). Then, a volume of carrier to be combined with the internal standard or the sample in a specified time interval is calculated to furnish the specified dilution (Block 320). For example, as shown in FIGS. 1 and 2, the processor 154 may be configured to receive a specified dilution for the internal standard 104 or a sample from the autosampler 122 and selectively adjust the volume of carrier 108 pumped in a specified time interval to furnish the specified dilution for the internal standard 104 or the sample. For example, the online dilution control module 168 may include control programming used to calculate one or more dilutions. Additionally, an operator may provide a desired dilution and/or a range of desired dilutions via a data entry device, such as a keyboard, a touchpad, and so forth.

Next, the pumping rates of the internal standard or the sample and the carrier may be controlled to furnish the internal standard or the sample and the calculated volume of carrier in the specified time interval (Block 330). For example, with continuing reference to FIGS. 1 and 2, the processor 154 may execute the control programming to control the pumping rates of the autosampler 122, the internal standard syringe pump 102, the first carrier syringe pump 106, the second carrier syringe pump 110, the third carrier syringe pump 112, and/or the diluent syringe pump 114 to furnish the specified dilution for the internal standard 104.

When the internal standard 104 is pumped at a constant flow rate, for example, the processor 154 may be configured to selectively adjust volumes of carrier 108 pumped by the first carrier syringe pump 106, the second carrier syringe pump 110, and/or the third carrier syringe pump 112 in a specified time interval to furnish the specified dilution for the internal standard 104 with respect to the carrier 108. In a specific instance, the control programming may include a threshold selected to control a switchover between the syringe pumps. For instance, when a flow rate of ten milliliters per min (10 mL/min) or less is desired, the processor 154 may use the three tenths milliliter (0.3 mL) second carrier syringe pump 110 to supply the carrier 108. Further, when a flow rate of more than ten milliliters per minute (10 mL/min) is desired, the processor 154 may use the three milliliter (3 mL) first carrier syringe pump 106 to supply the carrier 108.

Next, the pumping rates of the internal standard or the sample and the carrier can be controlled to furnish the calculated volume of carrier in the specified time interval (Block 330). In some instances, one pumping rate can be used for the carrier while priming a fluid line (Block 332), and another, different, pumping rate can be used for the carrier while performing sample analysis (Block 334). For example, with continuing reference to FIGS. 1 and 2, the control programming can be configured to adjust the flow rates of samples from the autosampler 122, the internal standard 104, the carrier 108, and/or the diluent 116 to provide on-the-fly flow rate control. For example, a high flow rate can be provided while priming the fluid lines, while a slower flow rate can be provided when sample analysis starts (e.g., with the ICP torch 128). Thus, the syringe pumps can be used to prime the fluid lines in a priming sequence designed to maximize the sample analysis rate while preventing overflow. This may be used with, for example, a closed loop system with a constant evacuation rate.

In one specific implementation, the syringes are filled one at a time, removing the air contained in each syringe. Then, the priming fluid is quickly loaded into the sample loop 132. Next, the second rotary valve 130 is switched, and a vacuum is used to send the priming fluid to waste. Then, while the analysis is performed (e.g., using the ICP torch 128), material can be supplied using the syringe pumps at a slower rate designed to prevent generating more waste then the drain chamber of the nebulizer 124 can accommodate. In a specific instance, this may reduce the amount of time required to prime the fluid lines and conduct a sample analysis from about ten minutes (10 min) to, for example, about one and one half minutes (1½ min).

The internal standard syringe pump 102, the first carrier syringe pump 106, the second carrier syringe pump 110, the third carrier syringe pump 112, and/or the diluent syringe pump 114 may each be refilled between samples. For example, the various syringe pumps may be refilled during rinse/washout of the cyclonic spray chamber 126.

In some implementations, the control programming may be used to identify each particular dilution from a single vial of a sample supplied from the autosampler 122 as one of multiple different sample vials when interfacing with, for example, data analysis software. Thus, multiple virtual vial locations may be generated using a single physical vial location.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a sample pump configured to pump a sample in a specified time interval;
   a first carrier syringe pump configured to pump a volume of a carrier to be combined with the sample in the specified time interval;
   a diluent syringe pump configured to pump a diluent to be combined with at least one of the sample or the carrier in the specified time interval; and
   control programming configured to receive a specified dilution for the sample and selectively adjust the volume of the carrier pumped by the first carrier syringe pump in the specified time interval to furnish the specified dilution for the sample,
   wherein the sample comprises an internal standard; and the sample pump comprises an internal standard syringe pump; the internal standard syringe pump, the first carrier syringe pump, and the diluent syringe pump coupled with a rotary valve for selectively supplying the internal standard, the carrier, and the diluent to and from the internal standard syringe pump, the first carrier syringe pump, and the diluent syringe pump.

2. The system as recited in claim 1, further comprising a second carrier syringe pump configured to pump a second volume of the carrier in the specified time interval, the control programming configured to selectively adjust (A) the volume of the carrier pumped by the first carrier syringe pump in the specified time interval and (B) the second volume of the carrier pumped by the second carrier syringe pump in the specified time interval to furnish the specified dilution for the sample with respect to the carrier.

3. The system as recited in claim 2, further comprising a third carrier syringe pump configured to pump a third volume of the carrier in the specified time interval, the control programming configured to selectively adjust (A) the volume of the carrier pumped by the first carrier syringe pump in the specified time interval, (B) the second volume of the carrier pumped by the second carrier syringe pump in the specified time interval, and (C) the third volume of the carrier pumped by the third carrier syringe pump in the specified time interval to furnish the specified dilution for the sample with respect to the carrier.

4. The system as recited in claim 1, wherein the internal standard syringe pump, the first carrier syringe pump, the diluent syringe pump, and the rotary valve are included in a single hardware module.

5. The system as recited in claim 4, further comprising:
   a sampler assembly for collecting a fluid sample from a plurality of samples;
   a nebulizer coupled with a cyclonic spray chamber for supplying an Inductively Coupled Plasma (ICP) torch with the fluid sample, the internal standard, and the carrier;
   a second rotary valve coupled with the sampler assembly, the nebulizer, and the rotary valve of the hardware module for receiving the internal standard and the carrier and supplying the internal standard and the carrier to the nebulizer, and for receiving the fluid sample from the sampler assembly and supplying the fluid sample to the nebulizer.

6. A method comprising:
   causing a sample to be pumped in a specified time interval;
   causing a volume of a carrier to be combined with the sample in the specified time interval;
   pumping a diluent to be combined with at least one of the sample or the carrier in the specified time interval; and
   automatically selectively adjusting the volume of the carrier pumped in the specified time interval to furnish a specified dilution for the sample,
   wherein the sample comprises an internal standard pumped with an internal standard syringe pump; the carrier is pumped with a first carrier syringe pump; the diluent is pumped with a diluent syringe pump; and the internal standard syringe pump, the first carrier syringe pump, and the diluent syringe pump are coupled with a rotary valve for selectively supplying the internal standard, the carrier, and the diluent to and from the internal standard syringe pump, the first carrier syringe pump, and the diluent syringe pump.

7. The method as recited in claim 6, further comprising:
   causing a second volume of the carrier to be combined with the sample in the specified time interval; and
   automatically selectively adjusting (A) the volume of the carrier pumped in the specified time interval and (B) the second volume of the carrier pumped in the specified time interval to furnish the specified dilution for the sample with respect to the carrier.

8. The method as recited in claim 7, further comprising:
   causing a third volume of the carrier to be combined with the sample in the specified time interval; and
   automatically selectively adjusting (A) the volume of the carrier pumped in the specified time interval, (B) the second volume of the carrier pumped in the specified time interval, and (C) the third volume of the carrier pumped in the specified time interval to furnish the specified dilution for the sample with respect to the carrier.

9. The method as recited in claim 6, wherein the internal standard syringe pump, the first carrier syringe pump, the diluent syringe pump, and the rotary valve are included in a single hardware module.

10. A method, comprising:
receiving a specified dilution for a sample;
causing a calculation of a volume of a carrier to be combined with the sample in a specified time interval to furnish the specified dilution;
automatically controlling a pumping rate for pumping the sample and a pumping rate for pumping the carrier to furnish the specified dilution of the sample in the specified time interval;
causing a calculation of a volume of a diluent to be combined with at least one of the sample or the carrier in the specified time interval; and
automatically controlling a pumping rate for pumping the diluent in the specified time interval to furnish the specified dilution for the sample with respect to the carrier and the diluent,
wherein the sample comprises an internal standard pumped with an internal standard syringe pump; the carrier is pumped with a first carrier syringe pump; the diluent is pumped with a diluent syringe pump; and the internal standard syringe pump, the first carrier syringe pump, and the diluent syringe pump are coupled with a rotary valve for selectively supplying the internal standard, the carrier, and the diluent to and from the internal standard syringe pump, the first carrier syringe pump, and the diluent syringe pump.

11. The method as recited in claim 10, further comprising:
causing a calculation of a second volume of the carrier to be combined with the sample in the specified time interval to furnish the specified dilution; and
automatically controlling a second pumping rate for pumping the carrier in the specified time interval to furnish the specified dilution for the sample with respect to the carrier.

12. The method as recited in claim 11, further comprising:
causing a calculation of a third volume of the carrier to be combined with the sample in the specified time interval to furnish the specified dilution; and
automatically controlling a third pumping rate for pumping the carrier in the specified time interval to furnish the specified dilution for the sample with respect to the carrier.

13. The method as recited in claim 10, wherein the internal standard syringe pump, the first carrier syringe pump, the diluent syringe pump, and the rotary valve are included in a single hardware module.

14. The method as recited in claim 10, wherein automatically controlling a pumping rate for pumping the sample and a pumping rate for pumping the carrier to furnish the specified dilution of the sample in the specified time interval comprises:
pumping the carrier at a first pumping rate for a first portion of the specified time interval; and
pumping the carrier at a second pumping rate different from the first pumping rate for a second portion of the specified time interval.

* * * * *